United States Patent [19]

Dzwinel

[11] Patent Number: 4,641,100

[45] Date of Patent: Feb. 3, 1987

[54] MULTIFREQUENCY METHOD FOR DIRECT AIRBORNE ELECTROMAGNETIC PROSPECTING OF HYDROCARBON DEPOSITS

[75] Inventor: Jan Dzwinel, Cracow, Poland

[73] Assignee: Instytut Gornictwa Naftowego i Gazownictwa, Cracow, Poland

[21] Appl. No.: 385,228

[22] Filed: Jun. 4, 1982

[30] Foreign Application Priority Data

Jun. 10, 1981 [PL] Poland ................................ 231633

[51] Int. Cl.$^4$ .................... G01V 3/16; G01V 3/165
[52] U.S. Cl. .................................. 324/330; 324/335
[58] Field of Search .................... 324/330, 331, 335

[56] References Cited

U.S. PATENT DOCUMENTS

| | | | |
|---|---|---|---|
| 2,929,984 | 3/1960 | Puranen et al. | |
| 2,931,973 | 4/1960 | Puranen et al. | |
| 3,123,766 | 3/1964 | Ruddock et al. | 324/330 |
| 3,538,428 | 11/1970 | Barringer | 324/330 |
| 3,604,660 | 9/1971 | Marley | 324/331 X |
| 3,663,953 | 5/1972 | Salvi | 324/331 X |
| 3,936,728 | 2/1976 | Ghosh et al. | 324/335 |
| 3,950,695 | 4/1976 | Barringer | |
| 4,258,322 | 3/1981 | Rocroi et al. | 324/335 |

FOREIGN PATENT DOCUMENTS

| | | |
|---|---|---|
| 1188363 | 6/1985 | Canada . |
| 2507786 | 4/1985 | France . |
| 827842 | 2/1960 | United Kingdom . |
| 0603935 | 5/1978 | U.S.S.R. ............................ 324/330 |

Primary Examiner—Gerard R. Strecker
Attorney, Agent, or Firm—Ladas & Parry

[57] ABSTRACT

A method for direct airborne electromagnetic prospecting of hydrocarbons by transmitting many primary electromagnetic fields and detecting any deviation of the primary electromagnetic fields due to secondary electromagnetic fields. The transmitting and detecting operations are carried out first over a known area comprising a known petroleum deposit and known barren locations (a stage of system instruction) and then over an unknown area to be explored (a stage of actual prospecting). The enormous volume of data obtained in both stages is processed electronically, using pattern recognition theory, into a probability level of the hydrocarbon presence or absence for all measuring points over the unknown area. In the stage of system instruction, the detected signal deviations are converted into factors of discriminant functions by substituting the high absolute probability levels for known hydrocarbon deposit and barren locations (above +0.8 and below −0.8, respectively) into these functions. In the prospecting stage, the probability level for points over unknown areas is determined by substituting the factors computed in the instruction stage into the same discriminant functions.

1 Claim, 2 Drawing Figures

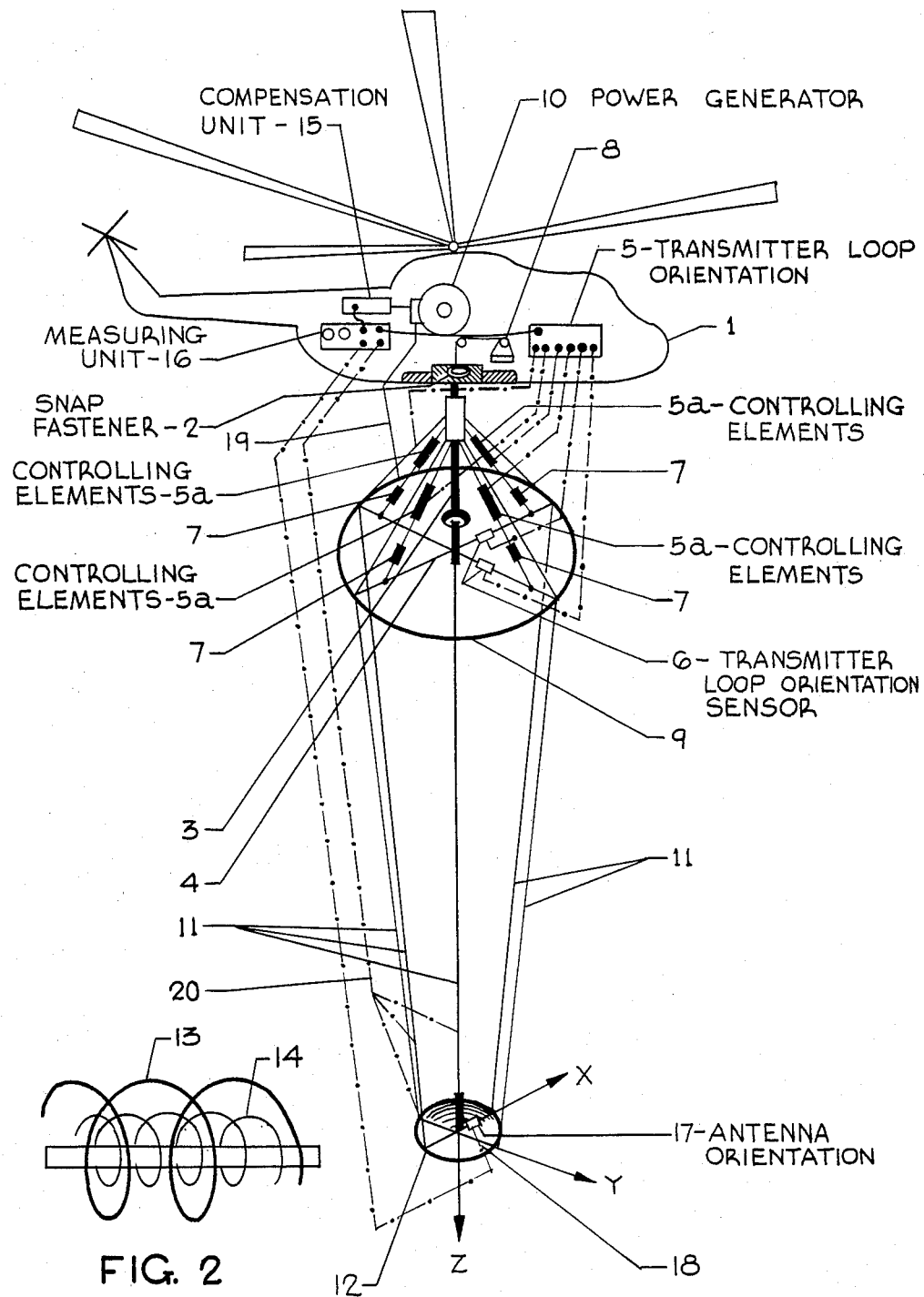

MULTIFREQUENCY METHOD FOR DIRECT AIRBORNE ELECTROMAGNETIC PROSPECTING OF HYDROCARBON DEPOSITS

BACKGROUND OF THE INVENTION

The present invention relates to a method for direct airborne electromagnetic prospecting of hydrocarbons; for example, oil and gas deposits. Specifically, it relates to a method wherein electromagnetic field induced polarization measurements are made by measuring the change in phase and amplitude of three orthogonal electromagnetic components $H_x$, $H_y$, $H_z$ at many different combinations of electromagnetic transmitter characteristics. The measured results are then electronically processed directly into hydrocarbon occurrence probability levels on the basis of pattern recognition theory.

DESCRIPTION OF PRIOR ART

The airborne electromagnetic method of geophysical exploration has come to be widely accepted and used in the search for ore deposits.

A review of the airborne electromagnetic method can be found in publications: Telford, W. M., Geldart, L. P., Sheriff, R. E., Keys, A. A., "Applied Geophysics", Cambridge University Press, Cambridge 1976, and Tarkhov, A. G., "Electrorazvedka-Spravochnik Geofizika", Nedra, Moscow 1980.

The method is based on the principle that if a cyclically alternating or otherwise varying electromagnetic field (referred to as a "primary field") is radiated over an area, the primary field normally penetrates the earth's surface and links with any electrically conductive bodies in the subsurface. Primary fields can be in the frequency range of 80–8000 Hz and can be radiated by passing an alternating current through a transmitter loop.

When the electromagnetic flux of a primary field links with a body of electrically conductive material, eddy currents are generated in the body and the resulting eddy currents radiate a secondary electromagnetic field which is of the same frequency as the primary field. Generally the secondary field is somewhat out of phase with the primary field. When an out-of-phase secondary field radiates into the primary field the resulting field is distorted. As electrically conductive bodies have special resistivity and induction characteristics, the phase-shift type distortions of the resulting electromagnetic fields over the area C and can be indicative of the location and of the important geological characteristics of subsurface bodies. Such possibilities have led to the art of electromagnetic prospecting. Localized subterranean zones or bodies that have abnormal electrical conductivity characteristics are referred to as "anomalies".

Heretofore, the art of electromagnetic prospecting has endeavored to develop a method to detect and apparatus to detect anomalies over areas suspected of containing ore or hydrocarbons. Thus, a geophysical system installed on a helicopter flying along a pre-determined measuring profile is used. The prospecting is carried out at one or two different flight altitudes. The geophysical systems used in these prior art airborne prospecting methods include a transmitter loop mounted in a fixed position on the helicopter, tunable to very few frequencies within the 80–8000 Hz frequency range and powered by an electric generator restricted to very few frequencies and having a power capacity up to 2.5 kW. At a distance of up to 150 meters, two induction receiver loops are positioned; one parallel to the plane of the transmitter loop and the other perpendicular to the plane of this transmitter loop. Both receiver loops are connected to an oscilliscope. Electric signals from the electromagnetic fields are generated in the receiver loops. These signals are fed to additional receiver apparatuses and analyzed for indications of important geological anomalies. The analysis for these prior art methods is done manually by an interpreter who completes the prospecting process by determining, for the flight area, anomalous deviation values of the measured amplitude and phase by performing correlation thereof with available geological information, and by classifying such anomalies as being or not being deposits or tectonic zones.

Such existing electromagnetic prospecting methods have serious difficulties in distinguishing between "desired" anomalies arising from commercial hydrocarbon deposits and "undesired" anomalies caused by commercially unimportant geological structures. Moreover, receiver loops often generate undesired "noise" signals from extraneous electromagnetic fields or other causes, causing additional problems of discriminating between noise and desired signals. Such electromagnetic prospecting is especially ineffective in hydrocarbon prospecting as the electrokinetic influence of the electrical structure of the pore spaces of rock containing hydrocarbons on the measured electromagnetic field cannot be employed. This is because of the low electrical relaxation time constant of such an electrical structure in relation to the frequencies employed.

In practice, electromagnetic methods have failed to produce diagnostic results in hydrocarbon prospecting. In electromagnetic prospecting, the effects of hydrocarbons on the electrical characteristics of rocks are generally very difficult to separate from other effects due to structure or near surface inhomogeneities. To distinguish between the effects of hydrocarbons and other effects requires deeper electromagnetic penetration as well as the measurement of many more parameters than in usual in prior art prospecting methods.

Prior methods of electromagnetic prospecting have a limited prospecting depth range, typically 100–300 meters beneath the surface of land or water due to the well known fact that electromagnetic wave absorption by rocks rapidly increases with depth for the frequency range these prior methods employ.

Another disadvantage of previous is that very little information is produced during electromagnetic surveying. Only a single or few electromagnetic field patterns, very few frequencies, and few changes in field direction and the field's electromagnetic components are employed. Such little information is generally ambiguous and cannot be suitably processed to produce diagnostic results. In practice, the only mathematical tool used in the data analysis is preconceived modelling curves to which the results obtained are fitted manually by an interpreter. Thus, the prospecting process is completed by an interpreter utilizing mainly his subjective ability and additional subjectively chosen geological information. As a final result, only the presence or absence of conductive layers may be determined, but geological classification of these layers cannot be established directly. Geologic classification is based on the subjective knowledge and experience of the interpreter.

Thus, the prior art electromagnetic methods do not have the power to acquire and interpret the quantities of data required for the electromagnetic prospecting to the truly diagnostic.

The disadvantage of the prior art geophysical systems is inherent in using the frequency range of 80–8000 Hz, low radiation power of up to 2.5 kW, and the lack of adjustment of the plane of orientation of the transmitter loop while airborne.

There is a longstanding need for a method using and apparatus using much greater power to acquire and interpret hundreds of times more data than prior art methods and apparatuses are capable of. Although the geophysical art attempted, for many years, to overcome the foregoing difficulties, none, insofar as we are aware, has been entirely successful in practice on a commercial prospecting scale.

SUMMARY OF THE INVENTION

The object of the present invention is to improve the method to directly determine the probability of hydrocarbon occurrence with good accuracy, reasonable measuring time, and to automatically collect and process data electronically.

Accordingly, the method of the present invention includes the following steps:

1. Transmitting many alternating primary electromagnetic fields over the known area or terrain (referred to as the instruction area or terrain);

2. Detecting at pre-determined measuring points any deviation of the primary fields due to secondary electromagnetic fields over the instruction area;

3. Transmitting the same primary electromagnetic fields over an unknown area to be surveyed (referred to as the prospecting area);

4. Detecting any deviation of the primary fields due to secondary electromagnetic fields over the prospecting area. In all foregoing steps many combinations of frequencies, helicopter altitudes and transmitter loop orientation are employed. Numerous electromagnetic components are measured for each of these combinations;

5. Storing the data acquired for each measuring point over the given area as a multidimensional vector of geophysical information (each dimension corresponds to one of the above mentioned characteristics rather than to a geographic or space dimension);

6. Choosing (with a computer) from the prospecting area those points having a multidimensional vector similar to points over the instruction area on the basis of pattern recognition theory and discriminant functions; and 7. Computing for each point over the prospecting area the probability level of hydrocarbon occurrence based on these similarities.

BRIEF DESCRIPTION OF THE DRAWINGS

The invention will now be described in conjunction with the attached drawings.

FIG. 1 is a diagrammatic view of the apparatus for direct airborne electromagnetic hydrocarbon prospecting; and FIG. 2 is a diagrammatic view of an induction antenna.

DESCRIPTION OF PREFERRED EMBODIMENTS

The system according to the invention is illustrated in FIG. 1 and includes a helicopter 1 with induction transmitter loop 9 and induction antennae 12. The induction transmitter loop 9 is suspended from the helicopter by means of a safety snap fastener 2, a shaft 3 with an articulated joint, a supporting frame 4 and an electric winch 8 for manipulating the system during helicopter take off and landing.

The induction loop is made of turns of an insulated single electric conductor. The frame and loop orientation is controlled from the helicopter cabin by means of an automatic controller 5' provided with controlling elements 5, frame inclination sensors 6 and shock absorbers 7. The induction transmitter loop 9 is supplied through a cable 19 with an alternating current from a power generator 10 which generates the six signals of different frequencies within the 0.1–10 Hz frequency range, e.g. 0.25—0.5—1—2—4—8 Hz.

The deviations of the primary field are received by three orthogonal induction antennae 12 suspended from the supporting frame 4 by means of lines 11 and provided with a horizontal aerodynamic shield 18. Each induction antenna 12 (with reference to FIG. 2) consists of an induction receiver circuit 13 and an induction compensation circuit 14, both wound on a permalloy core. The induction receiver circuits 13 are connected to the electronic measuring unit 16 by means of measuring cable 20, while the induction compensation circuits 14 are supplied from electronic compensation unit 15 with the said signals of different frequencies by means of a compensation cable (not shown). The induction antennae 12 are provided with antenna position sensor 17 connected via cable to the measuring unit 16. The measuring unit 16 consists of four blocks: (i) digital meter that measures amplitude and phase shift of signals detected by antennae 12, direction and inclination of induction transmitter loop 9 as sensed by sensors 6, orientation of induction antennae 12 as sensed by sensors 17 as well as helicopter altitude and topographic position as sensed by helicopter instruments, (ii) microprocessor, (iii) magnetic storage, and (iv) monitor and recording unit.

For a better understanding of the invention, its embodiment within the method will be presented in two stages:

1st STAGE—INSTRUCTION TECHNIQUE

Over the known area (within the total area to be explored or within similar or nearby areas), the known petroleum deposit location and nearby barren location are chosen (referred to as "reference" or "instruction" locations). Two straight and parallel measuring profiles of the same length are then set out over the petroleum deposit perpendicularly to its longitudinal axis. The distance between the profiles is one third of the length of the deposit, and should split the longitudinal axis of the deposit into thirds.

The profiles extend beyond each side of the deposit to a distance three times the width of the deposit. Also, two profiles perpendicular to the two above mentioned profiles are set out to form a closed rectangular "instruction route" for the helicopter. Each route is marked with bench marks on the earth's surface, well visible to the pilot of the helicopter.

Some barren location, between the helicopter landing field, the instruction area and the area to be explored (prospecting area), is chosen as being representative of the geologic region. This location will serve to compensate the system during each instruction or prospecting flight.

With reference to FIG. 1, the helicopter 1 reaches the highest prospecting altitude $h_1$, equal to one third of an average deposit width within the given region, and passes over the compensation location. The operator turns on the power generator 10, supplies the induction loop 9 with six frequencies (0.25—0.5—1—2—4—8 Hz) and checks the positions of induction loop 9 and induction antennae 12. When passing over the compensation location, the compensation unit 15 is turned on to compensate all three induction antennae 12 to the signal received by these antennae so the measuring unit 16 receives no signal (excluding noise). The compensation is carried out by supplying from compensation unit 15 to the induction compensation circuits 14, such amplitude and phase shift values for each frequency that compensate totally for the currents induced within the induction receiver circuits 13. The values used for this compensation are stored and protected in the measuring unit 16.

After the compensation flight is completed, Helicopter 1 starts flying along the first closed instruction route at the altitude $h_1$. The instruction measurements are carried out at points [referred to as "instruction points" with coordinates (x,y)] spaced up to 200 meters apart. A compensated signal amplitude $a_{xy}$ and phase shift $\varphi_{xy}$ in each antenna 12 are measured over all points as a function of frequency (i) and induction antenna orientation (k). A first flight along a closed rectangular route is carried out with the induction transmitter loop 9 in a horizontal position. The measured values are stored in the measuring unit 16.

During the next helicopter flight along the same rectangular route, the transmitter loop 9 is inclined forward at an angle of $+45°$, while a third flight along the rectangular route is carried out with the transmitter loop inclined backward at an angle of $-45°$. Each of these flights is performed at the same altitude $h_1$, over the same points (x,y), and with the signals compensated to zero over the compensation location. Also, the same frequencies and the same induction antenna 12 orientations are used. The fourth and fifth flights are performed as above, except that the transmitter loop inclination is changed to angles of 45° to the left and right sides, respectively. Additional sixth and seventh flights may be performed with the induction loop 9 inclined at an angle of 90° along or perpendicularly to the flight direction.

When all possible flight combinations at altitude $h_1$ are exhausted (these can also be limited by economic factors), the same flights are repeated at altitude $h_2 = 0.75h_1$. The same route, the same instruction points (x,y) and the same system characteristics are also employed. Subsequently, flights at altitude $h_3 = 0.75h_2$ are performed and so on ($h_4 = 0.75h_3$, $h_5 = 0.75h_4$, etc.) until safety and/or economic limits are reached.

Thus, the compensated amplitude $a_{xy}$ and phase shift $\varphi_{xy}$ values are stored digitally in the measuring unit 16 as a function of flight altitude (h), frequency (i), induction loop plane inclination and direction (j) and induction antenna orientation (k). This data is acquired successively as flights proceed.

All acquired data for every instruction point may be represented mathematically as a so called multidimensional vector of the point pattern or multidimensional vector of geophysical information about the instruction area (each dimension corresponds to one of the above mentioned characteristics rather than to a geographic or space dimension). The multidimensional vector may be written as $$\overline{A}_{xy} = \overline{a}_{xy}(hijk) + \overline{\varphi}_{xy}(hijk) \quad (1)$$

where $\overline{a}_{xy}(hijk)$ = vector elements formed with signal amplitudes measured at point (xy).

$\overline{\varphi}_{xy}(hijk)$ = vector elements formed with signal phases measured at point (xy).

$h = h_1, h_2, h_3 \ldots$ = altitudes of helicopter flight along closed rectangular routes formed with measuring profiles.

$i = 0.25, 1, 2, 4, 8$ Hz = frequencies of currents supplied to induction loop individually or collectively according to energy required.

$j$ = variable representing changes in directional characteristics of transmitter loop ie direction and inclination angle.

$k$ = variable representing three induction antennae that measure three components $H_x$, $H_y$, $H_z$ of the electromagnetic field.

$x,y$ = horizontal co-ordinates of individual instruction points determined on a map.

The data processing according to the invention starts with separating all multidimensional pattern vectors $\overline{A}_{xy}$ into the following sets of vectors for individual instruction points:

$\Sigma \overline{A}_{x'y'}$ = set of vectors for petroleum deposit (productive) locations.

$\Sigma \overline{A}_{x''y''}$ = set of vectors for barren instruction locations.

This operation, as well as further data processing, is carried out in the microprocessor of the measuring unit 16. A stationary computer may be employed if a suitable microprocessor is not available. Further data processing converts the said vectors in order to instruct the system on how to recognize the unknown reservoirs and barren locations in the given geological region. Pattern recognition theory is used for this conversion; specifically, a mathematical tool called a discriminant function is used. This embodiment of the invention employs a discriminant function that is known to those skilled in the art: e.g. Tou, J. T., Gonzalez, R. C., "Pattern Recognition Principles", Addison Wesley Publishing Company, London-Amsterdam-Don Mills, Ontario-Sydney-Tokyo 1974, i.e.

$$g(xy) = A_o(hijk) + \sum_1^h \sum_1^i \sum_1^j \sum_1^k \{[B_F(hijk)] \cdot [\overline{a}_{xy}(hijk)] + [C_F(hijk)] \cdot [\overline{\varphi}_{xy}(hijk)]\} \quad (2)$$

where $A_o(hijk)$, $B_F(hijk)$, $C_F(hijk)$ = factors of the discriminant function.

Such values of these factors are determined for each combination of (h,i,j,k) characteristics that meet the conditions:

(i) for $\Sigma \overline{A}_{x'y'}$ set of vectors $0.8 \leq g(x'y') \leq 1$ \quad (3)

(ii) for $\Sigma \overline{A}_{x''y''}$ set of vectors $-0.8 \geq g(x''y'') \geq -1$ \quad (4)

where $g(x'y')$ and $g(x''y'')$ are the discriminant function values for the instruction points over productive and barren locations, respectively.

It is to be understood that this embodiment of the invention can employ mathematical methods and assumptions for computing said factors that are known to those skilled in pattern recognition theory.

A detailed procedure for computing the factors of the discriminant function during instruction is as follows:

a. During the first flight at an altitude $h_1$, the following number of values "n" of individual characteristics is taken into consideration: $n_h=1$ (one value of altitude), $n_i=6$ (six values of frequency as given earlier), $n_j=1$ (one value of induction loop inclination) and $n_k=3$ (three induction antennae orientated in three orthogonal directions). A total of 18 combinations ($1\times6\times1\times3$) are taken into account, and for each of these combinations the factors $A_o(hijk)$, $B_F(hijk)$, and $C_F(hijk)$ are computed for each instruction point.

b. During the second flight at an altitude $h_1$, only a change in "j" characteristics occurs. However, data processing is carried out on the total information acquired in both flights, so we have: $n_h=1$, $n_i=6$, $n_j=2$, and $n_k=3$, i.e. 36 combinations and the same number of factor sets are computed for every instruction point.

c. During the next flights, still at an altitude $h_1$, the number of combinations, and therefore the information volume, increases by 18 any time the induction loop 9 inclination or direction is changed. On the fifth flight, for instance, 90 combinations are involved ($1\times6\times5\times3$).

d. When all flights at the second flight altitude $h_2$ are completed as with at $h_1$ altitude, the number of combinations is doubled so the number of dimensions of the $\overline{A}_{xy}$ vector is also doubled.

e. At other flight altitudes the volume of information acquired increases cumulatively as described above. Thus, an enormous data volume is obtained for each instruction point.

As a result of the instruction process, we have for each instruction point a very large set of values of the three discriminant function factors that are stored in the measuring unit 16 or in a stationary computer. For points over a petroleum field, these values meet the condition given by Eq. (3), while for points over barren locations the condition given by Eq. (4) is satisfied. As the discriminant function given by Eq. (1) is a so called "normalized function", its values g(xy) may be treated, according to pattern recognition theory, as a probability value of petroleum presence or absence [g(x'y') and g(x"y") values, respectively]. Thus, any instruction point of (x,y) co-ordinates is assigned to a mathematical multidimensional pattern of a reservoir or barren location, so the system is instructed how to discriminate between petroleum reservoir and barren areas in a given geological province.

For economic reasons, it is possible to automatically reduce the number of combinations involved to a reasonable minimum. A general rule of minimization is that such minimum values $n_h*$, $n_i*$, $n_j*$ are chosen that satisfy the conditions given by Eqs. (3) and (4), ie $$n_h*+n_i*+n_j*=\min. \qquad (5)$$

This minimization process, which may be treated also as an optimization process, may be performed as instruction proceeds. During the first flight, only the number of frequencies $n_i$ may be minimized by the microprocessor. When all flights at altitude $h_1$ are terminated, the number of induction loop orientations $n_j$ may be minimized. Finally, the number of flight altitudes may be optimized at the end of the system instruction process.

2nd STAGE—PROSPECTING TECHNIQUE

The prospecting technique is similar the the instruction process. Values of the discriminant function factors, $A_o(hijk)$, $B_F(hijk)$, and $C_F(hijk)$ obtained while instructing the system, are used to determine the petroleum occurrence probability g(xy) for individual points over the prospecting area (referred to as "prospecting points").

The prospecting points are measured during helicopter flights along closed rectangular routes, just as in the case of system instruction. To set out a prospecting route over the total prospecting area, preferably including the instruction deposits, a network of parallel linear prospecting profiles is determined in accordance with the regional dip of prospective strata. The profiles are determined and marked for the pilot by a surveyor with a spacing such that the smallest commercial deposit will have a high probability of being intersected by at least two of these profiles, and that at least one of the actual prospecting points will fall on such a deposit. Also, perpendicular profiles are set out through the ends of the above mentioned profiles, as in the case of the instruction process.

The helicopter starts prospecting from the compensating location and from the highest altitude, the further prospecting flights being the same as was described for the instruction flights. The same values of (hijk) characteristics are used as employed or optimized during the instruction process. The compensated values of amplitude $a_{xy}$ and phase shift $\phi_{xy}$ are measured with induction antennae 12 and stored in measuring unit 16 for all combinations of the above mentioned characteristics and for all prospecting points. Then a mathematical pattern of the area being explored is formed and stored as multidimensional vectors $\overline{A}_{xy}$ given by Eq. (1).

Henceforth, the prospecting procedure differs from that employed for system instruction. The elements of vectors $\overline{A}_{xy}$ stored for the prospecting points are used, together with stored values of discriminant function factors $A_o(hijk)$, $B_F(hijk)$, and $C_F(hijk)$, to compute a probability level g(xy) of hydrocarbon occurrence for a given prospecting point from Eq. (2). The g(xy) values computed are observed on the monitor of the measuring unit 16 as the flight proceeds.

Upon observance of a probability level of +0.8 or more, the flight along pre-programmed rectangular routes in interrupted and an order is given to the helicopter pilot to fly a series of smaller rectangles above the detected anomaly, always with (hijk) characteristics as employed or optimized during system instruction. This special routing of the flight is performed along a closed rectangular route whose size is determined by the size of the detected anomaly, as was the case for the instruction flight over the known reference deposit. When flying above a detected anomaly with a high probability level, the operator, on the basis of monitor observations, and in collaboration with the helicopter navigator, determines on the map the center of the maximum probability level and the isolines joining points having the same probability level, e.g. g(xy)=0.8. In this way, the detected alleged petroleum reservoir is localized.

After the localization of such a deposit, the helicopter returns to the interrupted prospecting flight along the programmed routes, and after detecting the next high probability anomaly, repeats the above mentioned procedure in order to localize the next corresponding alleged reservoir.

When the prospecting flight is concluded, a detailed map of probability contours over the total explored area is prepared. This may may be used to identify the location of wild-cat and exploration drilling prospects without the necessity of employing any other geological or geophysical information.

The present invention thus enables the complex, multidimensional pattern of deviations of the primary electromagnetic fields due to secondary electromagnetic fields to be converted directly into a probability level of hydrocarbon occurrence, and the probability values of petroleum presence and absence are mapped in an accurate manner, which is of great importance to the accuracy of the subsequent geophysical predictions and drilling decisions.

There are several important advantages of using the measuring system and the multidimensional geophysical pattern vector of this invention.

These advantages include the following:

a. A very large volume of information about the explored area is obtained. The data from each survey point consists of several hundred phase and several hundred amplitude values that have been extracted from the alternating receiver signals.

b. Improved depth penetration is achieved. As the invented apparatus allows for a considerable increase in radiated power and reduction of the frequency of the induction transmitter down to the range of 0.1–10 Hz, the possibility of a prospecting to a depth of up to 5000 meters is provided.

c. Elimination of subjective geological and geophysical interpretation from data processing procedures is achieved. All data processing is carried out automatically, without an interpreter's participation, and drilling locations are determined directly by the microprocessor or computer.

d. Ability to detect hydrocarbons directly in an accurate manner is provided. The complex, multiple electromagnetic fields provide the possibility of employing the electrokinetic influence of the electrical structure of rock pores containing hydrocarbons to detect deviations.

e. Reduction of risk and cost associated with hydrocarbon exploration programs is achieved, as this invention may be substituted for such inconclusive, incomplete and often undiagnostic prospecting techniques such as seismic and conventional electromagnetic surveys.

f. Rapid prospecting under all conditions is possible. The values of hydrocarbon occurrence probability are determined in the course of flight, or with an insignificant delay for computer data processing if no processor of suitable quality is available. Prospecting may be carried out under conditions independent of the relief and other characteristics of the explored area, including bodies of water.

In a preferred embodiment of the invention, with reference to FIG. 1, a supporting frame 4 has a diameter of 6 meters, the induction transmitter loop 9 is made of 700 turns of an insulated single conductor and is supplied with an alternating current of up to 50 amperes. Three induction antennae 12 are independent and perpendicular to each other, and are suspended at a distance of 30 meters from the supporting frame 4.

In other embodiments of the apparatus according to the invention, the diameter of the supporting frame 4 may be from 2 meters to 10 meters, the number of turns in the induction transmitter loop 9 may be from 200 to 1000, the amplitude of the alternating current supplying the loop 9 may range from 30 amperes to 100 amperes, and the distance between the induction transmitter loop 9 and the three induction antennae 12 can vary from 10 to 100 meters. Also, two concentric induction loops may be used so as to obtain superpositions of the electromagnetic fields and to reduce the number of flights. Moreover, two horizontal receiver circuits 13 of the induction antennae 12 i.e. those which measure the electromagnetic field components $H_x$ and $H_y$ and the two corresponding induction compensation circuits 14, may be connected in series in order to minimize any requirement concerning the antennae 12 orientation in relation to the flight direction. The induction antennae 12 may also be suspended from one central vertical line 11, while their "xy" plane orientation may be controlled by varied aerodynamic properties of the aerodynamic shield 18, such an orientation being sensed and recorded by a sensor 17 and the electronic measuring unit 16, respectively. In this cae, the "k" variable may be changed when flying and the multidimensional vector $\overline{A}_{xy}$ as well as the volume of data used for hydrocarbon recognition may be multiplied accordingly.

Other various modifications and alterations of the basic method may also be used, including other frequency values within the 0.1–10 Hz band, other induction transmitter loop inclination angles and directions, as well other values of the percentage of the altitude that the helicopter is successively lowered. Moreover, various discriminant functions, algorithms and assumptions pertaining to pattern recognition theory may be employed.

What is claimed is:

1. A method of direct airborne electromagnetic prospecting of hydrocarbon deposits, comprising the steps of:
   (a) transmitting many primary electromagnetic fields over an area comprising known hydrocarbon bearing and known barren locations, said many primary electromagnetic fields being transmitted from an induction transmitter loop mounted on a helicopter over many frequencies within the range of from 0.1 to 10 Hz, with many helicopter altitudes and with many positions of the plane of the induction transmitter loop;
   (b) detecting, over each of a number of said known hydrocarbon bearing and known barren locations, any deviation of amplitude and phase of all said many primary electromagnetic fields due to secondary electromagnetic fields over said known locations, said deviations of amplitude and phase being measured separately for each of the orthogonal electromagnetic components $H_x$, $H_y$, and $H_z$ by means of three orthogonal induction receiver antennae, and separately for each combination of said frequencies, helicopter altitudes and positions of the plane of the induction transmitter loop;
   (c) storing electronically said amplitude and phase data separately for each known hydrocarbon bearing and known barren location in said area;
   (d) converting said amplitude and phase data for each said known location into a multidimensional vector which represents the geophysical pattern of said known location, each said vector being a function of helicopter flight altitude, frequency, transmitter loop direction and inclination angle and the three induction receiver antenna orientations;

(e) electronically processing said vectors to obtain the factors of discriminant functions on the basis of pattern recognition theory, cumulatively as flights over said known locations proceed, said discriminant functions being normalized such that they provide values between 0.8 and 1.0 for said locations over said known hydrocarbon bearing locations, and values of $-0.8$ to $-1.0$ over said known barren locations, said values being a measure of probability level of petroleum presence and absence;

(f) transmitting said many primary electromagnetic fields over any designed number of measuring locations within an area to be explored;

(g) detecting, at said measuring locations, said deviations of amplitude and phase of said many primary electromagnetic fields due to secondary electromagnetic fields over said area to be explored;

(h) storing electronically said amplitude and phase data separately for each said measuring location;

(i) converting said amplitude and phase data into multidimensional vectors which represent the geophysical patterns of measuring locations within said area to be explored, said vectors being functions of flight altitude, frequency, transmitter loop direction and inclination angle, and the orientation of the three induction receiver antenna;

(j) processing electronically said vectors into a set of probability levels of petroleum presence or absence on the basis of pattern recognition theory cumulatively as flights over said measuring locations proceed, and probability level computed for measuring locations within said area to be explored, with the use of said normalized discriminant functions, selecting electronically, over said measuring locations within said area to be explored, the measuring locations having a high probability level, i.e. a pattern vector similar to those of points over said known locations; and (k) visually indicating and presenting thus computed probability levels on a monitor and providing a map of hydrocarbon occurrence probability contours.

* * * * *